United States Patent Office 3,804,891
Patented Apr. 16, 1974

3,804,891
BIS-(PHTHALIC ACID)-OXALIC ACID ANHYDRIDES AND RELATED COMPOUNDS
Michael McKay Rauhut, Norwalk, and Laszlo Joseph Bollyky, Stamford, Conn., assignors to American Cyanamid Company, Stamford, Conn.
No Drawing. Division of application Ser. No. 737,307, June 17, 1968, now abandoned, which is a division of application Ser. No. 485,920, Sept. 8, 1965, now Patent No. 3,399,137, which in turn is a continuation-in-part of application Ser. No. 425,599, now abandoned. Divided and this application May 20, 1971, Ser. No. 145,569
Int. Cl. C07c 63/14, 63/38
U.S. Cl. 260—515 P           1 Claim

ABSTRACT OF THE DISCLOSURE

A compound of the formula:

$$R\overset{O}{\underset{\|}{C}}O\overset{O}{\underset{\|}{C}}\overset{O}{\underset{\|}{C}}O\overset{O}{\underset{\|}{C}}R'$$

in which R and R' are each a substituent selected from the group consisting of non-substituted-aryl, arylmethyl, diarylmethyl, triarylmethyl, alkylaryl, alkoxyaryl, sulfoaryl, carboxyaryl, arylaryl, and aryloxaryl substituents, useful in a chemiluminescent composition.

---

This is a division of application Ser. No. 737,307, filed June 17, 1968, now abandoned, which is a division of application Ser. No. 485,920, filed Sept. 8, 1965, now matured to U.S. 3,399,137, which is a continuation-in-part of application Ser. No. 425,599, now abandoned.

The present invention relates to novel compositions of matter and reactions and to the direct generation of light from chemical energy employing such compositions. By "light" as referred to herein is meant electromagnetic radiation at wavelengths falling between 350 m$\mu$ and 800 m$\mu$.

The art of generating light from chemical energy, i.e., chemiluminescence is continually in search of compositions which when reacted substantially improve the intensity and lifetime of light emission as contrasted to known chemiluminescent compositions and reactions. Obviously, improved compositions are constantly in demand for use as signal devices, for area illumination, etc.

The art has known for some time that oxalyl chloride in combination with aqueous (30%) hydrogen peroxide and a fluorescent compound generates a light whose lifetime is very short (on the order of about 8 to 30 seconds) and whose intensity is of little practical utility. Numerous attempts have been made to improve this chemiluminescent composition and many other similar to it, but with little success.

According to a publication by Edward A. Chandross, ("Tetrahedrond Letter No. 12," pp. 761–765, 1963) the chemiluminescent reaction employing oxalyl chloride may be represented as follows:

(1)

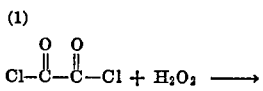

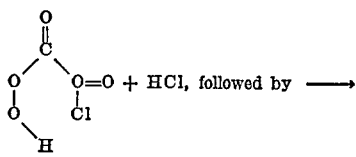

(2)

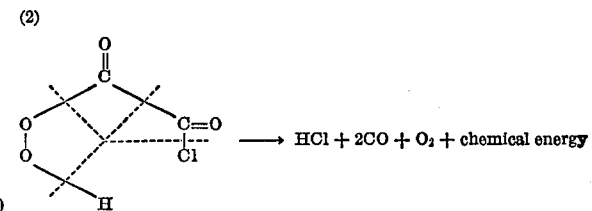

In the above reaction, a cyclic transition structure is first formed, followed by a breakdown of the ring into hydrochloric acid, carbon monoxide, oxygen, and chemical energy. It is clear that an essential mechanistic feature of the Chandross reaction, as represented by Chandross, is the splitting out of HCl from a six-membered cyclic transition state. Thus the process as described by Chandross requires the specific structure (2) since any alteration that eliminates the possibility of HCl elimination in a cyclic transition state would defeat the chemiluminescent process.

An extensive investigation which we have carried out has shown that, contrary to the teachings of Chandross, certain other oxalic acid compounds when reacted under certain conditions can unexpectedly provide chemiluminescence.

The mechanism of the oxalyl chloride reactions (as represented by Chandross) is an entirely different and distinct mechanism from that of this invention disclosed herein, as is discussed at length below.

It should also be recognized that the mechanism by which chemiluminescent light may be generated are so poorly understood that it is not possible at present to predict those structures which convey the chemiluminescent property. This is emply illustrated by the phthalhydrazide series of compounds, some of which are chemiluminescent and some of which are not chemiluminescent [see A. Bernanose, Bull. Soc. Chim. France, 17,567 (1950)].

It is an object of this invention to obtain a chemiluminescent composition and a process of employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will produce chemiluminescent light.

Another object of this invention is to obtain a reaction product formed by the reaction of an oxalic acid type anhydride of the formula described below with a peroxide, fluorescent compound, and a diluent which may include water.

We have unexpectedly discovered that the objects of this invention are obtained by admixing (1) an oxalic acid anhydride or an oxalic acid-type anhydride, (2) a peroxide, (3) a fluorescent compound and (4) a diluent. If conditions are not acid, water need not be added to the reaction, but the presence of a minor amount of water is preferred. The dianhydrides are the preferred reactants.

The term "chemiluminescent reactant," as used herein, means a mixture which will result in a chemiluminescent reaction when reacted with other necessary reactants in the process as disclosed herein.

The term "chemiluminescent composition," as used herein means a mixture which will result in chemiluminescence.

The term "admixing," as used herein, means "reacting" or sufficiently bringing together component reactants to obtain a chemiluminescent reaction.

The term "peroxidic groups," as used herein, represents "HOO—," "ROO—," or "RCOO—." "R" is defined in the anhydride below, but in which the "R" in "ROOH" cannot be aryl.

The term "diluent," as used herein, means a solvent or vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The anhydride compound of the oxalic acid-type suitable for use in applicants' invention includes a large number of preferred dianhydride compounds in the typical formula (RCOOCO(CO)$_n$OCOR', in which R and R' may be any aliphatic or aromatic groups, including halogen, or aromatically substituted compounds, for example, triphenyl substituted methyl groups and in which $n$ is at least 1 and may be any number above 1, such as 2, 3, 7, 9, 13, etc. However, other organic oxalic acid anhydrides may also be employed. Typical examples follow.

(A) Anhydrides of the following types:

where R or R':

(I) alkyl groups: e.g., decyl-; pentyl-; ethyl-, methyl-, isopropyl-, cyclohexyl-, etc. or substituted alkyl groups, by substituents such as:
(a) by aromatic groups: e.g. triphenylmethyl-, diphenylmethyl-, benzyl-;
(b) by halogen: e.g., chloromethyl-, chloropentyl-, bromobutyl-;
(c) by acyloxy group: e.g., benzoyloxyethyl-, acetoxydecyl;
(d) by carbonyl groups: e.g., formylmethyl-, propionylmethyl-;
(e) carboxyl group: e.g., carboxymethyl, carboxyethyl-;
(f) by alkoxy group: e.g., ethoxymethyl-, methoxyethyl-;
(g) by tertiary amino groups: e.g., acetylaminomethyl; methyl(phenyl sulfonyl)aminoethyl-, dimethylaminoethyl;
(h) by heterocyclic group: e.g., pyridylethyl-, furylmethyl, tetrahydrofuryl-propyl-, acridinylethyl-;
(i) by sulfo groups: e.g., sulfophenyl-;

In the above formula, either or both R and R' may be hydrogen, also.

(II) Aryl groups: e.g., phenyl-, naphthyl-, or substituted aryl groups by substituents such as:
(a) by alkyl groups: e.g., tolyl-, ethylphenyl-;
(b) by halogen: e.g., chlorophenyl-, bromophenyl-;
(c) by acyloxy groups: e.g., benzoyloxyphenyl-;
(d) by carbonyl groups: e.g., formylphenyl-;
(e) by carboxyl groups: e.g., carboxyphenyl-;
(f) by alkoxy groups: e.g., methoxyphenyl-;
(g) by amino groups: e.g., acetylaminophenyl-, diethylaminophenyl-;
(h) by heterocyclic groups: e.g., pyridylphenyl-, tetrahydrofurylphenyl-;
(i) by sulfo groups: e.g., sulfophenyl-;

(III) Heterocyclic groups: e.g., pyridyl-, furyl-, acridinyl-, tetrahydrofuryl, or substituted heterocyclic groups by substituents such as:
(a) by alkyl groups. e.g., methylpyridyl-;
(b) halogen: e.g., chloropyridyl-;
(c) by acyloxy groups: e.g., acetoxypyridyl-;
(d) by carbonyl groups: e.g., formylpyridyl-;
(e) by carboxyl groups: e.g., carboxypyridyl-;
(f) by alkoxy groups: e.g., methoxyfuryl-;
(g) by amino groups: e.g., dimethylamino-tetrahydrofuryl-;
(h) by sulfo groups: e.g., sulfofuryl-;

(IV) Unsaturated alkyl groups: e.g., vinyl-, allyl-, ethynyl-.

(B) Other hydrides, such as:

(a) anhydrides with dicarboxylic acids: e.g., malonic acid-, glutaric acid, adipic acid;
(b) cyclic anhydrides with dicarboxylic acid: e.g., malonic acid-, glutaric acid-;
(c) polymeric anhydrides with dicarboxylic acids: e.g., malonic acid-, adipic acid;
(d) anhydrides with acids which are fluorescent: e.g., an oxalic acid anhydride of 9-carboxy-10-phenyl anthracene, fluorescein, 9-carboxyacridine, o-phenoxyphenylbenzoic acid, methylterephthalic acid.

For any of the above anhydrides in which R and/or R' may be any of the typical substituents disclosed, $n$ may also vary, and as stated in the above structural formula, may be 1 or more. Typical acid anhydrides include oxalic acid anhydride in which $n$ is 1, ketomalonic acid anhydride in which $n$ is 2, diketosuccinic acid anhydride in which $n$ is 3, triketoglutaric acid anhydride in which $n$ is 4, tetraketoadipic acid in which $n$ is 5, heptaketoazelaic acid anhydride in which $n$ is 8, undecaketobrassylic acid anhydride in which $n$ is 12.

Typical compounds include bistriphenylacetic-oxalic anhydride, triketoglutaric-oxalic anhydride, dibenzoic-oxalic anhydride, bis-(4-methoxybenzoic)-oxalic anhydride, dibenzoictetraketoadipic anhydride, dilauric-oxalic anhydride, dipivalicdiketosuccinic anhydride, glutaric-oxalic anhydride, bis(2,4-dimethoxybenzoic)-oxalic anhydride, etc.

It should be noted that when R and/or R' are an alkoxy carbonyl group, the structure of the anhydride could be as follows:

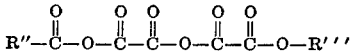

in which R" and/or R'" typically could be any of the above stated values for R and R'. This typical compound is thus seen to introduce the concept of a chain type compound as within the scope of this invention.

Oxalic acid di-anhydrides that have produced uniform results are (1) bis(triphenylacetic)oxalic anhydride, (2) dilauric acid oxalic acid anhydride, and (3) bis(4-methoxy benzoic) oxalic anhydride. The bis(triphenylacetic)oxalic anhydride obtains the preferred results of this invention.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed. Although the presence of water is necessary in order to obtain the chemiluminescence in certain embodiments of this invention, the peroxide employed may be obtained from anhydrous hydrogen peroxide compounds, such as, perhydrate or urea (urea peroxide), perhydrate of pyrophosphate (sodium pyrophosphate peroxide), pyrohydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 0.1 to 100% and may be diluted before or after mixing, though the latter is generally preferred. The acid anhydride component may be added as a solid or in admixture with a suitable solid peroxide reactant or in a suitable diluent or alternatively dissolved directly in a solution containing the peroxide reactant.

Typical diluents within the purview of the instant discovery are those that do not readily react with a peroxide, such as, hydrogen peroxide, and which do not readily react with the carboxylic anhydride of oxalic acid.

Because water is a necessary reactant in the production of chemiluminescent light in certain (i.e., acidic) embodiments according to the present invention, it is obvious that the water also can serve as a minor portion of the diluent. Under natural conditions, water at least under 0.1 molar concentration is preferred. The term "water," as used herein, includes water-producing compounds, such as, hydrates. In addition, however, either one or more diluents may be included with or in the place of water, so long as the peroxide employed is at least partially soluble in the diluent(s), such as, for example, at least one gram of $H_2O_2$ per liter of diluent. The following are illustrative of the additional diluents or solvents which may be employed; non-cyclic or cyclic ethers, such as, diethyl ether, diamyl ether, diphenyl ether, anisole, tetrahydrofuran, dioxane, and the like; esters, such as, ethyl acetate, propyl formate, amyl acetate, dimethyl phthalate, diethyl phthalate methyl benzoate, and the like; aromatic hydrocarbons, such as, benzene, xylene, toluene, and the like.

If the reaction medium contains an acid in an amount sufficient to obtain a strongly acid pH of less than about pH 3, (1) water or (2) an alcohol (such as anhydrous ethyl alcohol) should be present to obtain an optimum chemilumescent reaction and if water is a partial diluent, the water may be present in an amount up to less than about 70% water, based on the total percentage of diluent; however, lower percentages of water are preferred.

The fluorescent compounds contemplated herein are numerous and they may be defined broadly as those which do not readily react on contact with the peroxide employed in this invention, such as, hydrogen peroxide; likewise, they do not readily react on contact with an aliphatic anhydride of oxalic acid. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, napthacene, substituted naphthacene, pentacene, substituted pentacene, and the like. Also, included are heterocyclic compounds, such as, tetraphenyl porphine, zinc tetraphenyl porphine, and diphenylisobenzofuran. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Flourescence and Phosphorescence," by Peter Pringsheim, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, for example, a chemiluminescent anhydride, such as the oxalic acid anhydride of 9-carboxy-10-phenyl anthracene does not require a separate fluorescent compound to obtain light. Other typical fluorescent oxalic acid anhydrides include (1) 1-carboxyacridine, (2) rubrene-2-carboxylic acid, (3) anthracene-1-carboxylic acid, and (4) 1,3-bis(4-carboxyphenyl)isobenzofuran.

It has been found that the molar (moles per liter of diluent) concentrations of the major components of the novel composition herein described may vary considerably. It is only necessary that components be in sufficient concentration to obtain chemiluminescence. The anhydride of oxalic acid concentration normally is in the range of at least about $10^{-7}$, preferably in the range of at least about $10^{-4}$ to about 1 molar; the fluorescent compound is present in the range from about $10^{-5}$ to 5, preferably $10^{-4}$ to $10^{-1}$ molar; under acidic conditions the water or an alcohol must be present in an amount sufficient to initiate the reaction; and the diluent must be present in a sufficient amount to form a solution of the reactants involved in the chemiluminescent reaction. There is no known maximum limit on the concentration of anhydride employed in the reaction.

One typical embodiment of the invention involves the use of two separate liquid phases in a single container where one phase contains the anhydride of this invention and the other phase contains hydrogen peroxide, and either phase contains a fluorescent compound. In this embodiment reaction takes place at the interface between phases. A typical example would be the use of solution of anhydride and fluorescer in dimethylphthalate and an aqueous solution of hydrogen peroxide. It is within the scope of this invention to use other combinations of miscible and particularly immiscible solvents.

Another typical embodiment of this invention involves the use of a solvent having poor solution capacity for the anhydride so that a substantial quantity of the anhydride remains undissolved initially. Similarly, other solvents could be employed in which some other necessary reactant is insoluble.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative chemiluminescent reactants may be prepared which may be stored over a period of time and which may be admixed with the final ingredient at a time when the chemiluminescent lighting is desired. For example, one such reactant should include an oxalic acid anhydride and a fluorescent compound, but which does not include a peroxide compound and does not include water. Another example would be a reactant which includes an oxalic acid anhydride, a fluorescer, and a perborate, but which does not include a solvent. An alternative reactant would include an oxalic acid anhydride, a fluorescent compound, and a waterbound compound such as a stable hydrate such as magnesium sulfate hydrate, but which does not include a peroxide compound. Obviously, the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition; it has been found (1) that each of the above objects are achieved to an unexpectedly superior degree when the peroxide compound is added and admixed subsequent to the admixing of all other necessary ingredients, (2) that in the embodiment in which water is included and in which the mixture is alkaline, the anhydride must be added before water addition in order to obtain chemiluminescence, and (3) the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about −40° C. and 75° C., preferably between about 20° C. and 50° C.; however, the luminescence of applicants' process is not limited to these ranges. However, temperature is not critical.

Additionally, the composition and the process which obtain preferred results has a pH of about pH 3 or more, whereby the above objects of the invention are achieved to a highly superior degree.

A wide variety of organic and inorganic acids is contemplated, typical acids being: alkane sulfonic acids, such as methane sulfonic acid, ethane sulfonic acid, butane sulfonic acid, and the like; aromatic sulfonic acid such as benzene sulfonic acid, para-toluene sulfonic acid, phenyl sulfonic acid, and the like; trifluoroacetic acid; mineral acids such as HCl, $HNO_3$, $H_2SO_4$ and purophosphoric; Lewis acids, including $AlCl_3$, etc.; perchloric acid, borontrifluoride; organophosphorus acids, such as, phenylphosphonic acid, and the like; etc.

The following oxalic acid anhydrides are novel chemiluminescent compounds: a compound of the formula:

in which R and R' are each a substituent selected from the group consisting of non-substituted-aryl, arylmethyl, diarylmethyl, triarylmethyl, alkylaryl, alkoxyaryl, sulfoaryl, carboxyaryl, arylaryl, and aryloxyaryl substituents, where typical substituted aryl substituents include methoxyphenyl, dimethoxyphenyl, trimethoxyphenyl, tetramethoxyphenyl, pentamethoxyphenyl, alkylphenyl, and polyalkylphenyl.

In the practice of the above process, to obtain chemiluminescent light, a peroxide such as hydrogen peroxide reacts with the anhydride of an oxalic acid to produce an intermediate compound in which a peroxide group replaces an aliphatic acid group (RCOO—) adjacent to an oxygen substituted carbon atom, said peroxide-substituted product being capable of further reaction to produce chemiluminescence in the presence of fluorescer.

A subsequent intermediate second reaction takes place by the reaction of the first formed (singly substituted) intermediate reacting with water whereby at least one remaining aliphatic acid group (RCOO—) adjoining an oxygen substituted carbon reacts to obtain a second intermediate reaction product in which the reacting aliphatic group is replaced by a hydroxy group to form an acid. Alternatively, a peroxide other than hydrogen peroxide may resort in the second step to give a diperoxyoxalate. The mechanism of applicants' invention, i.e., the reactions and the intermediate products, is represented by the following equations:

(1) First intermediate reaction:

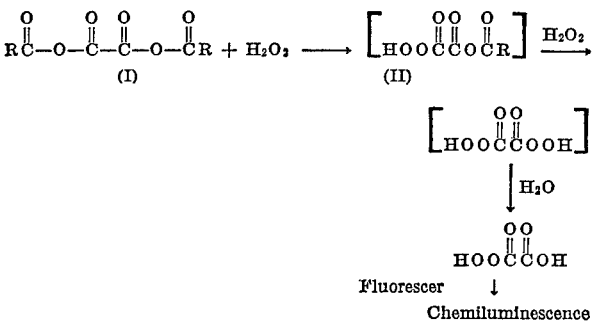

(2) Second intermediate reaction:

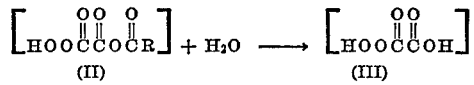

(3) A third reaction subsequently takes place in which the second intermediate Compound III breaks down thereby releasing chemical energy, according to the following reaction:

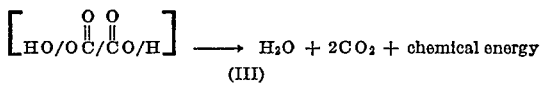

If any one or more of the fluorescent compounds (discussed above) is present, each fluorescent compound absorbs chemically released energy, and subsequently activated compound(s) release(s) energy in the form of light, known as chemiluminescent illumination, according to the following reactions:

(4)

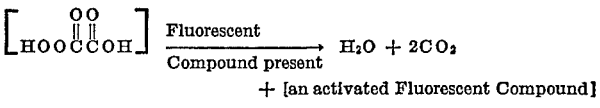

(5) [Activated Fluorescent Compound]→the Fluorescent Compound+light.

For the above Compound I, if an organohydroperoxide, such as t-butyl hydroperoxide, is substituted for the above hydrogen peroxide, the reaction product would be a compound of the typical Formula IV

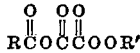

a monocarboxylic acid anhydride of a monoperoxyester of oxalic acid, in which R' can be solely an alkyl, and in which R is H, or alkyl, or aryl.

Similarly, if a peroxycarboxylic acid, such as peroxylauric acid, is reacted with the above Compound I, a reaction product of the typical Formula V

in which both Rs may be H or alkyl or aryl—a monocarboxylic acid anhydride of a monoacyl- or monoarylperoxyoxalic acid.

Under conditions where water is a reactant, at least part of the light emission is derived from the decomposition of monoperoxyoxalic acid, which is derived from the reaction of hydrogen peroxide with a monocarboxylic anhydride of oxalic acid according to the following mechanism:

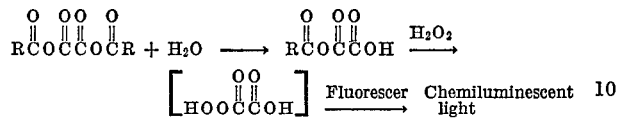

The above Compounds II, III, IV, V, and VI are new compounds. Also, the Compound VI (a monoanhydride of oxalic acid) illustrates that the scope of this invention includes the employment of monoanhydrides of the oxalic acid-type.

It is clear that no apparent relationships exist between the mechanism of this invention, as represented above, and the mechanism of oxalyl chloride as represented by Chandross, discussed above at length. Moreover, as is evident from the examples below, the chemiluminescent intensity and lifetime of light emission from the process disclosed herein are both markedly superior to the intensity and lifetime of the Chandross process.

Although the above reactions are believed to be the mechanism by which Applicants' invention produces chemiluminescent light, the invention disclosed herein is not to be restricted to this theory, except as limited on the appended claims.

Within the broad generic invention in which oxalic acid anhydrides having chemiluminescent properties when reacted with a peroxide compound and diluent is disclosed, there are subgeneric inventions as follows:

Where the reaction of the oxalic acid anhydride is carried out in an acidic pH, it was unexpectedly discovered that water must be present in an amount up to about less than 70% of the solvent employed. Moreover, only peroxides which would ultimately produce hydrogen peroxides ($H_2O_2$) work in aqueous media employing an acid.

Peroxide compounds which do not work when the anhydride reaction takes place in acidic media, include peroxide compounds, such as, perbenzoic acid, benzoyl peroxide, perlauric acid, di-t-butyl peroxide and t-butyl hydroperoxide.

When the anhydride is reacted under near neutral or alkaline (basic) conditions, at a pH above about pH 4.5, it has been unexpectedly found that the reaction media may be anhydrous; however, a small amount of water is preferred. Under neutral or alkaline conditions, it has been found that peroxides which work include peroxide compounds, such as, hydrogen peroxide, perbenzoic acid, benzoyl peroxide, perlauric acid, and t-butyl hydroperoxide. However, di-t-butyl peroxide does not work in the anhydrous state, under alkaline reaction conditions.

Pursant to the present invention, disclosed herein, very intense light is generated and the light emissions last anywhere from about 16 to 60 times longer than that of the art-known aqueous compositions described hereinbefore, such as oxalyl chloride.

The following examples are intended to illustrate the present invention and are in no way intended to limit the invention except as limited in the appended claims.

EXAMPLES

The anhydrides of oxalic acid prepared for and used in the test experiments below are as follows:

(A) Bistriphenylacetic acid oxalic acid anhydride

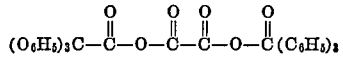

(B) Diacetic acid oxalic acid anhydride

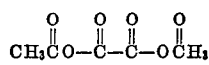

(C) Dilauric acid oxalic acid anhydride

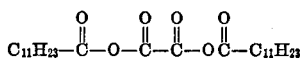

(D) Bis-4-methoxybenzoic-oxalic anhydride

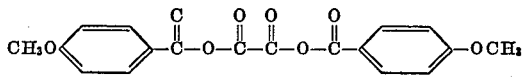

(A) and (D) exhibit a preferred degree of chemiluminescence and (D) additionally exhibits a preferred degree of thermal stability. However, (A) through (D) are each superior to random compounds such as dibenzoic acid oxalic acid anhydride.

Example I

Approximately 3 mg. Compound A is added to 5 ml. solution of 1 mg. 9,10-diphenylanthracene and 0.25 ml. water in 1,2-dimethoxyethane (glyme) maintained at a temperature of 25–30° C. No peroxide compound was employed. No chemiluminescence is observed.

Example II

Approximately 5 mg. Compound A is added to 5 ml. solution of 1 mg. 9,10-diphenylmethane, 0.25 ml. water and 0.2 ml. methane sulfonic acid in 1,2-dimethoxyethane (glyme) maintained at a reaction temperature of 25–30° C. No peroxide compound is employed. No chemiluminescence is observed.

Peroxides used in the tests below are as follows:

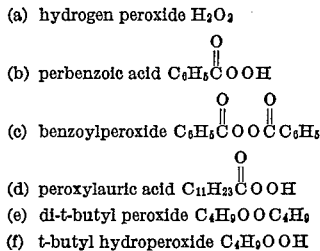

Example III

Approximately 3 mg. Compound A is added to a 5 ml. solution of 1 mg. 9,10-diphenylanthracene, 0.25 ml. water (optional) and 0.5 ml. 90% aqueous hydrogen peroxide [peroxide (a)] in 1,2-dimethoxyethane (glyme) maintained at a reaction temperature of 20–25° C. No acid and no base is added. A strong blue light is emitted for several minutes on the addition of Compound A to the solution. Strong chemiluminescent light emission is obtained when no water is added and also when peroxide is anhydrous $H_2O_2$ or 30% aqueous $H_2O_2$.

Thus, chemiluminescence is obtained when water is present without either acid or base being added.

Example IV

Approximately 3 mg. Compound A is added to a 5 ml. solution of 1 mg. 9,10-diphenylanthracene and 0.3 ml. anhydrous hydrogen peroxide in glyme maintained at a reaction temperature of 10–15° C. Strong blue light is emitted for several minutes.

Thus, chemiluminescence is obtained in the absence of water without the addition of either acid or base.

Example V

Approximately 3 mg. Compound A is added to a 5 ml. solution of 1 mg. 9,10-diphenylanthracene and 0.2 ml. methane sulfonic acid and 0.3 ml. anhydrous hydrogen peroxide in glyme maintained at a reaction temperature of 25–30° C. No chemiluminescence is observed. However, a bright blue light is emitted for about 15–20 minutes when 0.3 ml. water is added to the solution. In the reaction, the water may be replaced by anhydrous (absolute) ethyl alcohol.

Thus, under acid conditions, water or an alcohol is necessary for a chemiluminescent reaction.

Example VI

Approximately 3 mg. Compound A is added to a 5 ml. solution of 1 mg. 9,10 - diphenylanthracene, 0.2 ml. methanesulfonic acid, 0.25 ml. water and about 15 mg. t-butyl hydroperoxide [peroxide (f)] in glyme maintained at a reaction temperature of 25–30° C. No chemiluminescence is observed.

The results are identical with peroxides as follows: (b), (c), (d), (e), (f).

Identical results are obtained with peroxide (f) at a reaction temperature of 5° C.

Strong chemiluminescence is observed for 15–20 minutes when peroxide (a) (above) is employed and:

(a) when Compound A, B, C, or D are used;
(b) when Compound A was used with rubrene in the place of 9,10-diphenylanthracene;
(c) when Compound A is used with rubrene or with 9,10-diphenylanthracene, at 60° C.

Example VII

Approximately 3 mg. of Compound A is added to a 5 ml. solution of 1 mg. 9,10-diphenylanthracene, 0.2 g. KOH and 0.3 ml. anhydrous hydrogen peroxide in anhydrous glyme while the reaction temperature was maintained at 25–30° C. Very bright chemiluminescence is observed which lasted for 5–10 minutes.

Thus, chemiluminescence was obtained in the absence of water when base is present during the reaction.

Essentially similar results are obtained with peroxides as follows: (a), (b), (c), (d), (f). Note that peroxide (e) fails to produce chemiluminescence.

The addition of 1–2 ml. water to the emitting solution quenched the chemiluminescence.

Thus, under alkaline conditions, the presence of a substantial amount of water defeats the chemiluminescent reaction.

Example VIII

Approximately 3 mg. of Compound A is added to a 5 ml. solution of 1 mg. 9,10-diphenylanthracene, 0.3 ml. water, 0.2 g. KOH and about 15 mg. t-butylhydroperoxide in glyme while the reaction temperature is maintained at 65–70° C., no chemiluminescence is observed.

The result is identical when peroxide (d) is used.

Thus, the conclusion based on Experiments 7 and 8 may be drawn as follows: (1) even small amounts of water present under alkaline conditions prevents the chemiluminescent reaction if the addition of water precedes the addition of the anhydride to the reaction mixture; (2) however, if water is added subsequent to the addition of anhydride to the reaction mixture substantial amounts of water are required to defeat the chemiluminescent reaction.

Example IX

First 1 mg. 9,10 - diphenylanthracene, then approximately 4 mg. Compound A are added to a solution of 4 ml. tetrahydrofuran, 6 ml. water, 0.3 ml. 90% aqueous hydrogen peroxide and 0.2 ml. methane sulfonic acid. Blue light is emitted on addition of Compound A to the reaction mixture. Thus, water may be used as solvent for the chemiluminescent reaction.

Example X

The light emission from a 3.0 ml. of a solution of $5.67 \times 10^{-3}$ molar bistriphenylacetic-oxalic anhydride, 0.05 molar hydrogen peroxide, and $5 \times 10^{-4}$ molar 9,10-diphenylanthracene in anhydrous dimethyl phthalate was measured quantitatively with a spectrofluorimeter. It was observed that light emission continued for a period exceeding 30 minutes and that the light intensity remained above one-half its maximum value for a period of about 7 minutes. The quantum efficiency of the system based on the moles of anhydride use was calculated to be about $11.8 \times 10^{-2}$ einsteins mole$^{-1}$. This efficiency compares favorably to quantum yields of light reported for previously known chemiluminescent reactions such as the luminol-hydrogen peroxide-sodium hypochlorite system which has been reported to have an efficiency of $2 \times 10^{-3}$ einsteins mole$^{-1}$ (T. Brenner, Bull. Soc. Chim. Belges, 62, 569 (1953). If bis(triphenylacetic)oxalic anhydride is replaced by oxalyl chloride under the above conditions, less than one-half as much light is obtained, the intensity remains above one-half its maximum value for less than 2 minutes, and the emission is essentially extinguished after about 5 minutes. Thus, carboxylic acid anhydrides with oxalic acid are substantially superior to oxalyl chloride with regard to lifetime and to light output.

This example corresponds to Example III above, except no water is employed and the reaction is here carried out at 20° C.

Examples XI through XVI

Example III is repeated for each of these examples, replacing the oxalic acid-type anhydride with an anhydride not having the typical oxalic acid structure, as follows:

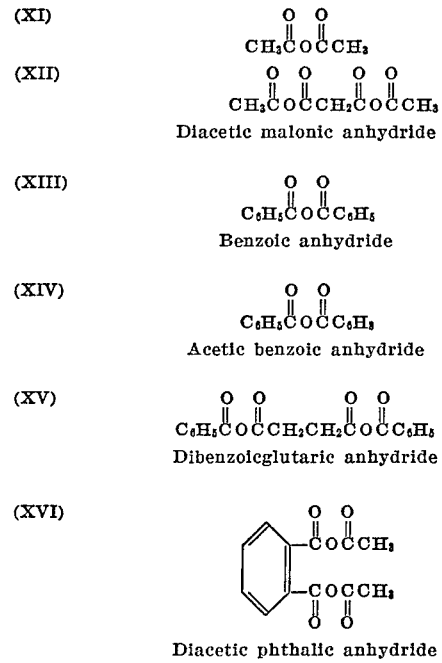

For each of these examples, no chemiluminescence is obtained. These examples therefore demonstrate that anhydrides of the non-oxalic acid type fail to obtain the chemiluminescence of this invention.

Example XVII

The quantum yield of chemiluminescence of the triphenylacetic oxalic anhydride-hydrogen peroxide-diphenylanthracene system was measured by the use of a spectroradiometer-fluorimeter. The glass stoppered cell used for the measurement held 3 ml. solution, had a 1 cm. thickness and enclosed a magnetic stirrer for agitation.

QUANTUM YIELD OF CHEMILUMINESCENCE

| Bis(triphenyl-acetic)oxalic anhydride, mole/l. | Hydrogen peroxide, mole/l. | 9,10-diphenyl-anthracene, mole/l. | Solvent | Quantum yield einstein/mole of anhydride | Maximum light intensity, ft. lambert | $t_{1/4}$ I,[a] minutes |
|---|---|---|---|---|---|---|
| (1) $5.67 \times 10^{-3}$ | 0.05 | $5 \times 10^{-4}$ | Dimethyl phthalate | $11.8 \times 10^{-3}$ | 0.07 | 34 |
| (2) $4.94 \times 10^{-3}$ | 0.25 | $1 \times 10^{-3}$ | Benzene-dimethylphthalate (6-4 by volume) | $0.199 \times 10^{-3}$ | 0.11 | 7 |
| (3) [b] $4.94 \times 10^{-3}$ | 0.25 | $1 \times 10^{-3}$ | ....do.... | $1.23 \times 10^{-3}$ | 0.69 | 11 |

[a] Time required for the light intensity to decrease to one-fourth of its maximum value.
[b] At the beginning of the measurement some water was added to render the solution approximately 1.83 molar in water. Although not all of the water dissolved, it was finely dispersed in the solution due to the excellent agitation.

Therefore, Example 17 indicates both that a highly efficient chemiluminescent system may be obtained by the use of bis(triphenylacetic)oxalic anhydride (see No. 1 being the previously described Example X), as well as that the chemiluminescent efficiency may be improved by the addition of water as a separate phase (No. 3 containing water as compared to No. 2 without added water).

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container such as (1) an insoluble or (2) dissolvable capsule in which the reactant of this invention is enclosed for subsequent reaction with the other ingredients of this invention.

We claim:
1. A compound of the formula

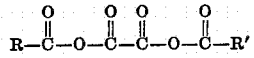

wherein R and R' are carboxyphenyl or carboxynaphthyl groups.

No references cited.

JAMES A. PATTEN, Primary Examiner

U.S. Cl. X.R.

252—188.3, 301.2 R, 301.3 R; 260—279 R, 295 R, 333, 335, 345.9, 346.2, 347.3, 404.8, 475 R, 476 R, 485 R, 488 J, 502 R, 507 R, 537 R, 546 R